(12) United States Patent
Davis et al.

(10) Patent No.: US 8,271,368 B2
(45) Date of Patent: Sep. 18, 2012

(54) METHOD AND SYSTEM FOR CLEARING FINANCIAL INSTRUMENTS

(75) Inventors: Douglas Paul Davis, Ballston Spa, NY (US); Edward Kwabena Obeng, Niskayuna, NY (US); David T. Reichard, Orchard Park, NY (US)

(73) Assignee: Keycorp, Cleveland, OH (US)

(*) Notice: Subject to any disclaimer, the term of this patent is extended or adjusted under 35 U.S.C. 154(b) by 0 days.

(21) Appl. No.: 13/367,025

(22) Filed: Feb. 6, 2012

(65) Prior Publication Data

US 2012/0136791 A1 May 31, 2012

Related U.S. Application Data

(62) Division of application No. 12/208,893, filed on Sep. 11, 2008, now Pat. No. 8,112,337.

(51) Int. Cl.
G06Q 40/00 (2006.01)

(52) U.S. Cl. .......................................... 705/35; 705/45

(58) Field of Classification Search .................. 705/39, 705/45, 35
See application file for complete search history.

(56) References Cited

U.S. PATENT DOCUMENTS

| | | | |
|---|---|---|---|
| 5,237,159 A | 8/1993 | Stephens et al. | |
| 5,412,190 A | 5/1995 | Josephson et al. | |
| 5,532,464 A | 7/1996 | Josephson et al. | |
| 5,691,524 A | 11/1997 | Josephson | |
| 5,783,808 A | 7/1998 | Josephson | |
| 5,819,236 A | 10/1998 | Josephson | |
| 5,870,721 A | 2/1999 | Norris | |
| 6,019,282 A | 2/2000 | Thompson et al. | |
| 2002/0188564 A1 | 12/2002 | Star | |
| 2003/0200174 A1 | 10/2003 | Star | |
| 2006/0064380 A1 | 3/2006 | Zukerman | |
| 2006/0213978 A1 | 9/2006 | Geller et al. | |
| 2006/0213979 A1 | 9/2006 | Geller et al. | |
| 2006/0213980 A1 | 9/2006 | Geller et al. | |
| 2008/0097899 A1* | 4/2008 | Jackson et al. | 705/39 |
| 2010/0312705 A1* | 12/2010 | Caruso et al. | 705/45 |

* cited by examiner

Primary Examiner — Samica L Norman
(74) Attorney, Agent, or Firm — Thompson Hine L.L.P.

(57) ABSTRACT

A method and system for electronically clearing financial instruments through a clearing system in which a per item cost of clearing instruments varies with the time of day. Files of items containing data scanned from financial instruments including an amount of each instrument may be received by a control system that may apply a rule to sort the items by determining whether the item be stored or forwarded for clearing. The rule may include a step of determining whether an amount of the instrument exceeds a predetermined value or meets a certain criteria, and if so, forwarding the instrument for clearing without storage. If the amount of the instrument does not exceed the first predetermined value or meet the criteria, the system may store the item for forwarding at a later time when the per item fee for clearing is lower.

17 Claims, 4 Drawing Sheets

| FedForward Fee Schedule Tier 1 Electronic Endpoints in Mixed Image Cash Letters ||
|---|---|
| Deadline (ET) | Per Item Fee |
| by 3:00 p.m. | $0.010 |
| by 6:00 p.m. | $0.010 |
| by 8:00 p.m. | $0.010 |
| by 10 p.m. | $0.015 |
| by 12:01 a.m. | $0.023 |
| by 2:00 a.m. | $0.028 |
| by 4:00 a.m. | $0.035 |
| by 7:00 a.m. | $0.065 |
| by 10:00 a.m. | $0.065 |

Fig. 3

METHOD AND SYSTEM FOR CLEARING FINANCIAL INSTRUMENTS

RELATED APPLICATION

This application is a divisional application of, and claims all rights of priority under 35 U.S.C. §120 to, U.S. Ser. No. 12/208,893 filed Sep. 11, 2008 and titled "METHOD AND SYSTEM FOR CLEARING FINANCIAL INSTRUMENTS," now U.S. Pat. No. 8,112,337.

BACKGROUND

This disclosure relates to methods and systems for processing electronic documents and, more particularly, to methods and systems for processing financial instruments through an electronic clearing system.

The Check Clearing for the 21st Century Act, or Check 21 Act, was signed into law on Oct. 28, 2003. Provisions of the Act took effect on Oct. 28, 2004. This law allows a financial institution to receive a paper check, create a digital version of that check that includes a digital image of the check, and transmit the digital version of the check to another financial institution, such as the payee bank. The recipient institution may convert the digital version of that check back to a paper check, called a substitute check.

The ability of banks, the Federal Reserve ("Fed") and other financial institutions to work with digital check images has facilitated the presentment and clearing of financial instruments. It is no longer necessary for retailers, banks or other financial institutions to transmit paper checks for the clearing process in order to receive payment. Rather, banks and other financial institutions may utilize electronic clearinghouses, such as Small Value Payment, Co. LLC, to facilitate the high-speed and reliable image exchange between member banks and financial institutions.

The Fed, the central bank of the United States, also provides electronic check clearing services for member institutions. A per item fee is assessed to banks and other financial institutions utilizing the Fed for clearing checks. As a result of variations in traffic volume over the course of a business day, the Fed charges per item fees for clearing checks that vary depending upon the time of day and the day of the week.

For example, the fees listed in the table of FIG. 3 are taken from the Fed's 2008 FedForward Fee Schedule. The table shows the per item fees charged for a mixed image cash letter for Tier 1 electronic endpoints. (The listing is simplified from the actual schedule and does not show, for example, availability of services by day of the week, or per item fees for Tier 2 and Tier 3 electronic endpoints.) As shown in the table of FIG. 3, each banking day contains many deadlines for sending check items to be cleared by the Fed. Checks forwarded for clearing by the 3:00 p.m. deadline are charged $0.010 per item. Checks forwarded for clearing by the 6:00 p.m. and 8:00 p.m. deadlines are also charged $0.010 per item for items in a mixed image cash letter. Although the per item fees are the same for items forwarded for clearing to Tier 1 electronic endpoints after the 10:00 a.m. deadline, through the 3:00 p.m. and 6:00 p.m. deadlines, to the 8:00 p.m. deadline, the intermediate deadlines have associated with them fees for other operations, such as clearing items to substitute check endpoints, that vary from one deadline to the next.

Referring again to FIG. 3, the most expensive per item fee is assessed to check items cleared to Tier 1 electronic endpoints after the 4:00 a.m. deadline and before the 10:00 a.m. deadline, where the fee is $0.065 per item. It is less desirable to clear checks after the 7:00 a.m. deadline and before the 10:00 a.m. deadline because of issues of poor availability, even though the per item fee is the same. In contrast, the per item fee for items cleared to Tier 1 electronic endpoints by the 3:00 p.m., 6:00 p.m. or 8:00 p.m. deadlines are the cheapest at $0.010. Therefore, it may be desirable to clear check items to meet those deadlines.

SUMMARY

The disclosed method and system preferably may be used for processing data, scanned or otherwise obtained from financial instruments. In one aspect, the method and system disclosed may be used for clearing financial instruments through a clearing system of a type in which a cost of clearing an instrument varies with the time of day. Financial instruments are scanned and files of items pertaining to the instruments are created. The items may include information pertaining to the financial instruments, including an amount of each instrument. The disclosed method may include the steps of receiving files of scanned financial instruments and applying a rule to sort the items in the electronic files by determining, for each of the instruments, whether each item in a file should be stored or forwarded for clearing the instrument without storage.

The stored items may be held for clearing before a later deadline when the per item rates for clearing such instruments are lower. Thus, by holding some instruments for clearing at a later time in which the per item clearing cost is lower, the financial institution implementing the method may save clearing costs. The rule applied to sort items may include a step of determining whether an amount of the instrument represented by the item exceeds a first predetermined value, and if the amount of the instrument does exceed the predetermined value, the instrument may be forwarded for clearing without storage.

In contrast, if the amount of the instrument does not exceed the predetermined value, the associated file may be stored for forwarding at a later time in which the per item fee is less. This process may be used to sort financial instruments into pockets in which high-cost instruments, for example checks for $1000 or greater, may be forwarded for clearing promptly, whereas checks for less than $1000 may be stored for later clearing during a time of a lower per item fee.

Another embodiment of the disclosed method and system addresses the Fed delay in clearing checks that must be transmitted to certain endpoints. The Fed publishes a list of endpoints by ABA (American Banking Association) bank numbers, and for endpoints in certain geographic areas, the Fed requires an extra day to clear checks transmitted for clearing to such endpoints. This may be due to a variety of factors, such as the proximity of one or more of the endpoints to a Federal Reserve Bank. In another aspect, the rule applied by the system to received files of items of financial instruments may include a step of determining whether an instrument is drawn on a financial institution at one of such endpoints, and if so, storing the associated item for forwarding at a later time in which the per item fee is lower. This rule may be implemented since the clearing process would not, in any event, result in an immediate clearing of the financial instrument due to the location of the payee bank endpoint on which the instrument is drawn.

In another aspect, the rule applied by the system may include determining whether the instrument in question is issued by the United States government, and if so, forwarding the instrument for clearing without storage, regardless of the amount. This rule may be implemented since the Federal Reserve does not charge a fee for clearing United States government checks that are deposited in separate cash letters.

In another aspect, the rule applied by the disclosed system may include a store or send threshold amount that varies depending upon the time of day the item in question is received. For example, items less than or equal to $350 received after 12:01 a.m. and before the 2:00 a.m. deadline may be stored for forwarding at a later time having a lower per item fee, while items greater than $350 received during that time interval may be forwarded immediately to the Federal Reserve for clearing. If an item is received after 2:00 a.m. and before the 4:00 a.m. deadline (thus having a higher per item clearing fee than assessed after 12:01 a.m. and before the 2:00 a.m. deadline), it may be forwarded only if it exceeds $650. If an item is received after 4:00 a.m. and before the 7:00 a.m. deadline, the per item fee is higher, and the threshold at which an item may be sent immediately for clearing by the Fed may be raised to greater than $1000.

The interval after 7:00 a.m. and before the 10:00 a.m. deadline has the highest per item Fed clearing fee and poorest availability, and in one aspect, the rule employed by the disclosed system and method may dictate that the system not send any items for clearing. In contrast, the interval after 10:00 a.m. and before the 3:00 p.m. deadline has the lowest per item Fed clearing fee, and in one aspect of the disclosed system and method all items received during that time interval may be forwarded immediately to the Fed for clearing. Further, all items held in storage that were received during earlier, more costly time intervals may be forwarded for clearing during this time interval.

The system for performing the method may interface with a device for scanning financial instruments and creating electronic files containing items associated with each of the instruments containing information that may include an amount of each instrument, payee bank, routing number and an electronic image of the instrument. The disclosed system may include a control system for receiving electronic files from the scanning device and having a processor programmed to apply a rule to sort the items by determining, for each of the items, whether the item should be stored or forwarded for clearing the instrument without storage. In one aspect, a scanning device may scan a MICR (magnetic ink character recognition) line, amount, account number, user field, check number, serial number, flag and routing/transit number from the instrument and create an associated electronic file.

The system may further include a gateway server for receiving files of scanned financial instruments from the scanning devices and transmitting the electronic files to the control system. The system also may include an image export server for receiving the files from the control system converting the files to a preferred format, such as X9.37, storing the files in storage, retrieving the files from storage for clearing and transmitting the associated electronic files to the Federal Reserve or other clearing service provider.

BRIEF DESCRIPTION OF THE DRAWINGS

FIG. 3 is a table of deadlines and fees for per item check processing taken from the 2008 FedForward Fee Schedule for Tier 1 electronic endpoints in mixed image cash letters.

DETAILED DESCRIPTION

Figure 1:
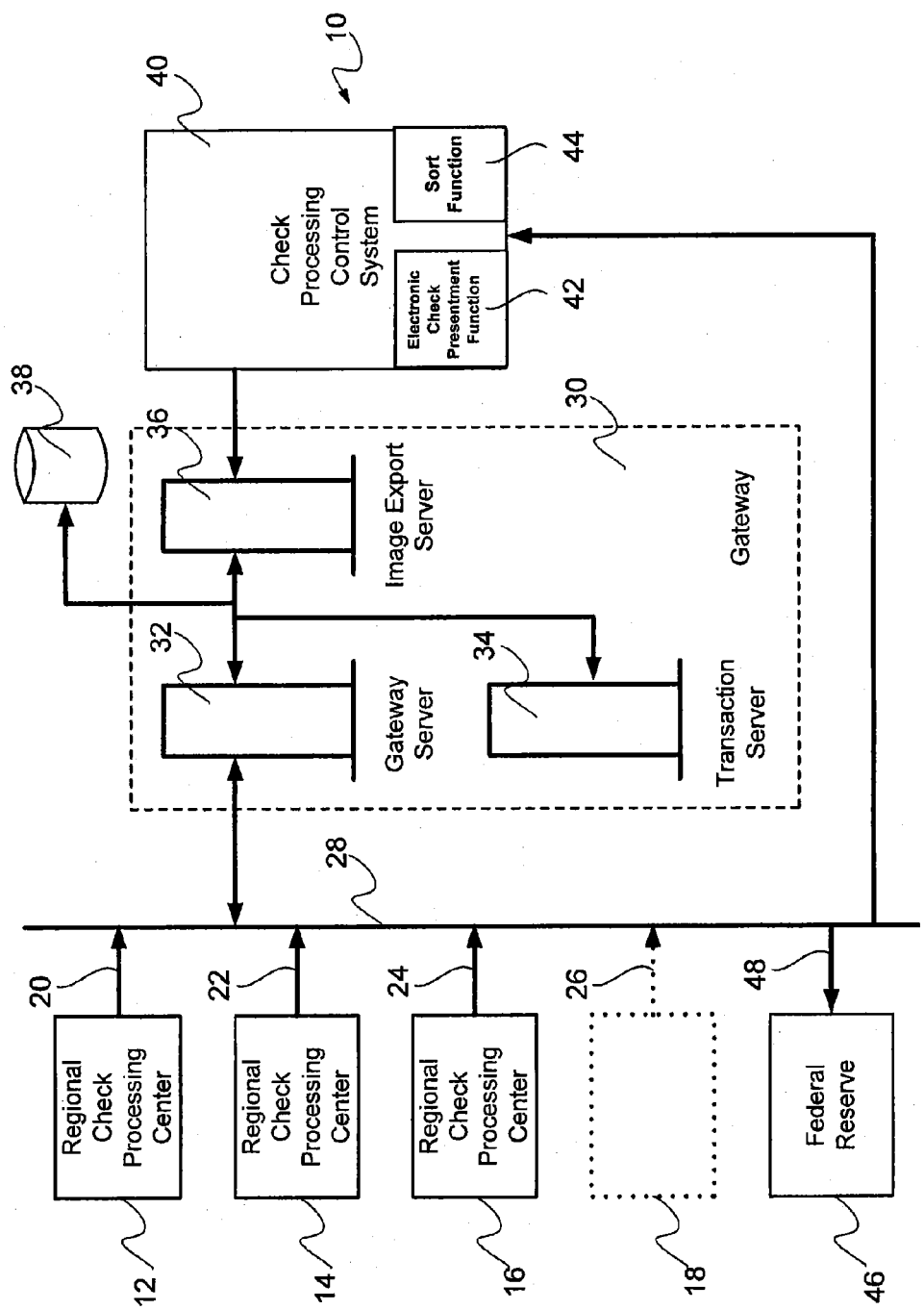
FIG. 1 is a schematic diagram showing the disclosed system for clearing financial instruments.

As shown in FIG. 1, the disclosed system for clearing financial instruments, generally designated 10, may be configured to receive electronic files from regional check processing centers 12, 14, 16, 18. At such check processing centers 12-18, paper checks may be scanned to read the MICR line, the amount of the checks, the account number, the user field, the check number/serial, flag, and routing and transit number. This information may be used to create an electronic file for each check, preferably in X9.37 format, that preferably includes images of both sides of the check. The files of scanned checks may be transmitted along with an electronic cash letter, a report that accompanies the checks transmitted to a bank or other financial institution or the Federal Reserve. The cash letter report may include the amount of each check, the sequence number, bundle totals (count and amount) and the grand total of the cash letter (count and amount).

While the disclosed method and system are described with reference to the transmission of electronic checks, it should be understood that the disclosed system and method also may be used with other types of financial instruments, and use in connection with such other instruments is within the scope of this disclosure.

The regional check processing centers 12-18 may receive paper checks from banks, savings and loans, credit unions, other financial institutions, retailers and the like. However, it is within the scope of the invention to provide the system 10 with electronic files of checks from other scanning devices. The scanned checks from processing centers 12-18 may be transmitted by means of networks 20, 22, 24, 26 to a local area network (LAN) 28. It is within the scope of the disclosure to utilize the Internet, preferably by way of a virtual private network, as opposed to private networks to transmit electronic check images. Further, although not shown in FIG. 1, the LAN 28 may be protected from incoming data transmissions by conventional means such as firewall servers.

The system 10 may include a gateway, generally designated 30, that may include a server 32 (incorporating, for example, the IBM TotalStorage NAS Gateway 500 system), transaction server 34 and image export server 36. The image export server 36 may communicate with a storage device 38. The server 32 may function as a gateway to a storage system created by the gateway 30. A typical storage device 38 may include a distributed check image management system provided by Carreker Corporation and consist of an IBM R/S 6000.

The system 10 also may include a check processing control system, generally designated 40. The check processing control system may include a commercially available module 42, such as CheckLink, provided by Carreker Corporation, which processes checks in electronic form. The check processing control system 40 also may include a module 44 that may perform a sort function upon incoming check image files by applying business rules. The sort function may place incoming check image files into two pockets: a first pocket in which the check image files may be sent to the gateway 30 for clearing, and a second pocket in which the check image files may be sent to the gateway for storage in the storage device 38 by the image export server 36. Checks sent for clearing are transmitted by the gateway 30 to the network 28 and on to the Federal Reserve clearing system 46. The transmission over network 48 may be by a private network or the Internet.

Figure 2:
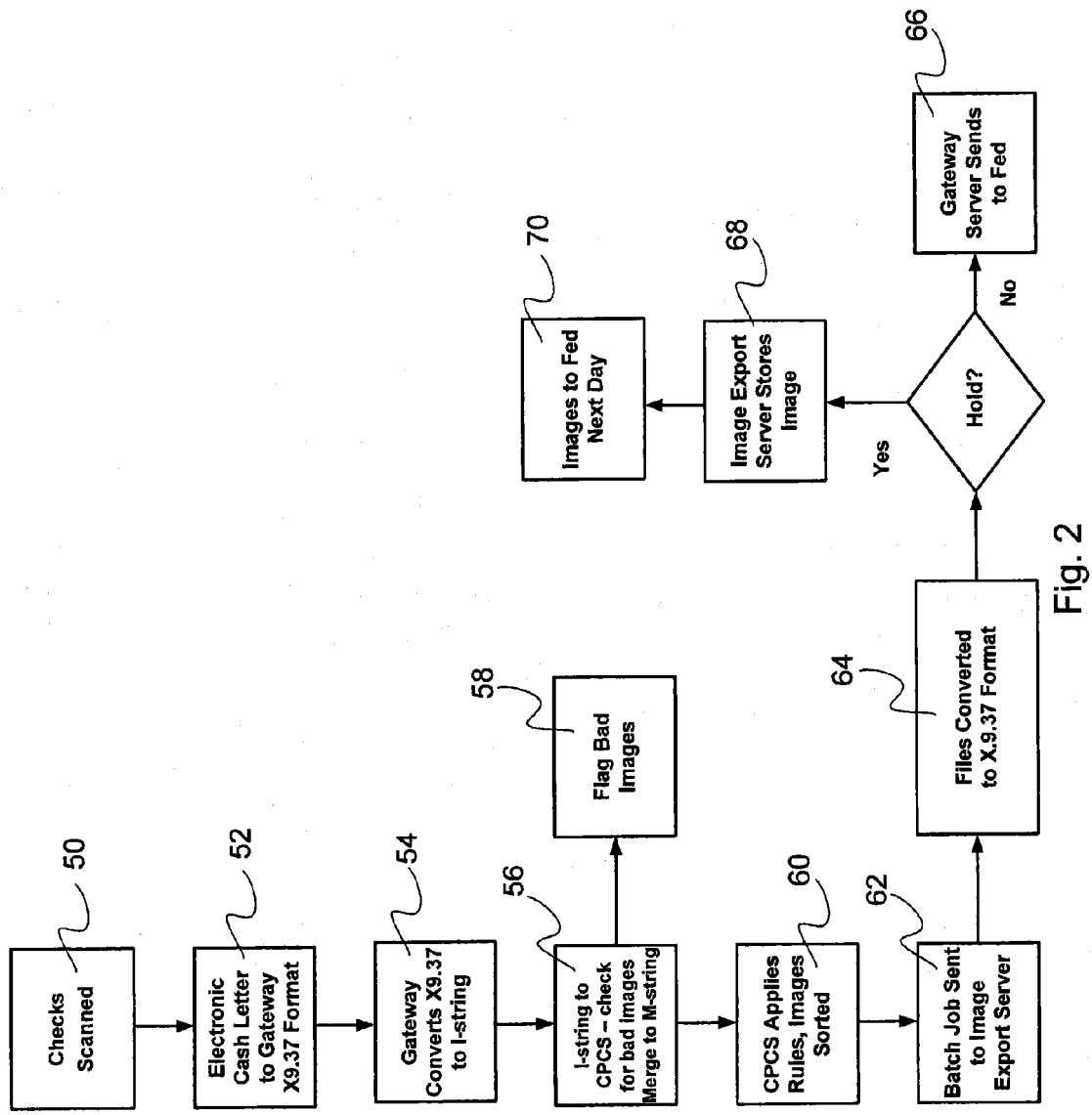
FIG. 2 is a flow chart showing the method for clearing financial instruments embodied in the system of FIG. 1.

The process performed by the system of FIG. 1 is shown schematically in FIG. 2. As indicated in block 50, the process may begin when paper checks are scanned at the regional processing centers 12-18 (FIG. 1). The scanning process may read the MICR line and other data such as the amount, account number, user field, check number/serial number, flag and routing/transit number from the check. The scanning also may include the creation of an image of both sides of the check itself. This data may be written in X9.37 format and sent by way of the networks 20-26 to the LAN 28, along with a cash letter summarizing the instruments scanned and sent, as indicated in block 52. The electronic files embodying the check data and images may be sent to the gateway 30 where it is received by gateway server 32. The gateway server 32 sends the check images, data and cash letter to the check processing control system 40, where the electronic check presentment function 42 converts the format to an I-string, as indicated in block 54, so that the individual checks can be sorted. As indicated in block 56, the check image files may be checked for accuracy and completeness, and as indicated in block 58, the defective image files may be flagged and corrected.

The electronic check presentment function 42 then creates an M-string, which is a merging of images from the I-string with corrected reject data. The function also may generate reports that reconcile and balance the input to ensure that all check items have been captured.

As indicated in block 60, the sort function 44 of the check processing control system 40 may apply business rules to the check image files, and a sorting function performed on the items in each file. The check files may be sorted into two groups, a first group that may be sent directly on for clearing by the Federal Reserve without storage, and a second group that may be stored in storage 38 for clearing at a later time. Once the sort function has been performed by the module 44, as indicated in block 62, the check image files may be sent to the image export server 36 of the gateway 30. The image export server may then convert the files back to the X9.37 format, as indicated block 64. If an image file has been sorted into the aforementioned first group, as indicated in block 66, that image file may be forwarded by the image export server 36, through the gateway server 32 to the Federal Reserve 46. If a check image falls into the second group, as indicated in block 68, the image export server 36 may store the image in storage 38. The image export server may retrieve the check image file at a later date, which may be the next business day, for transmission through the gateway server 32 to the Federal Reserve 46 for clearing.

Figure 4:
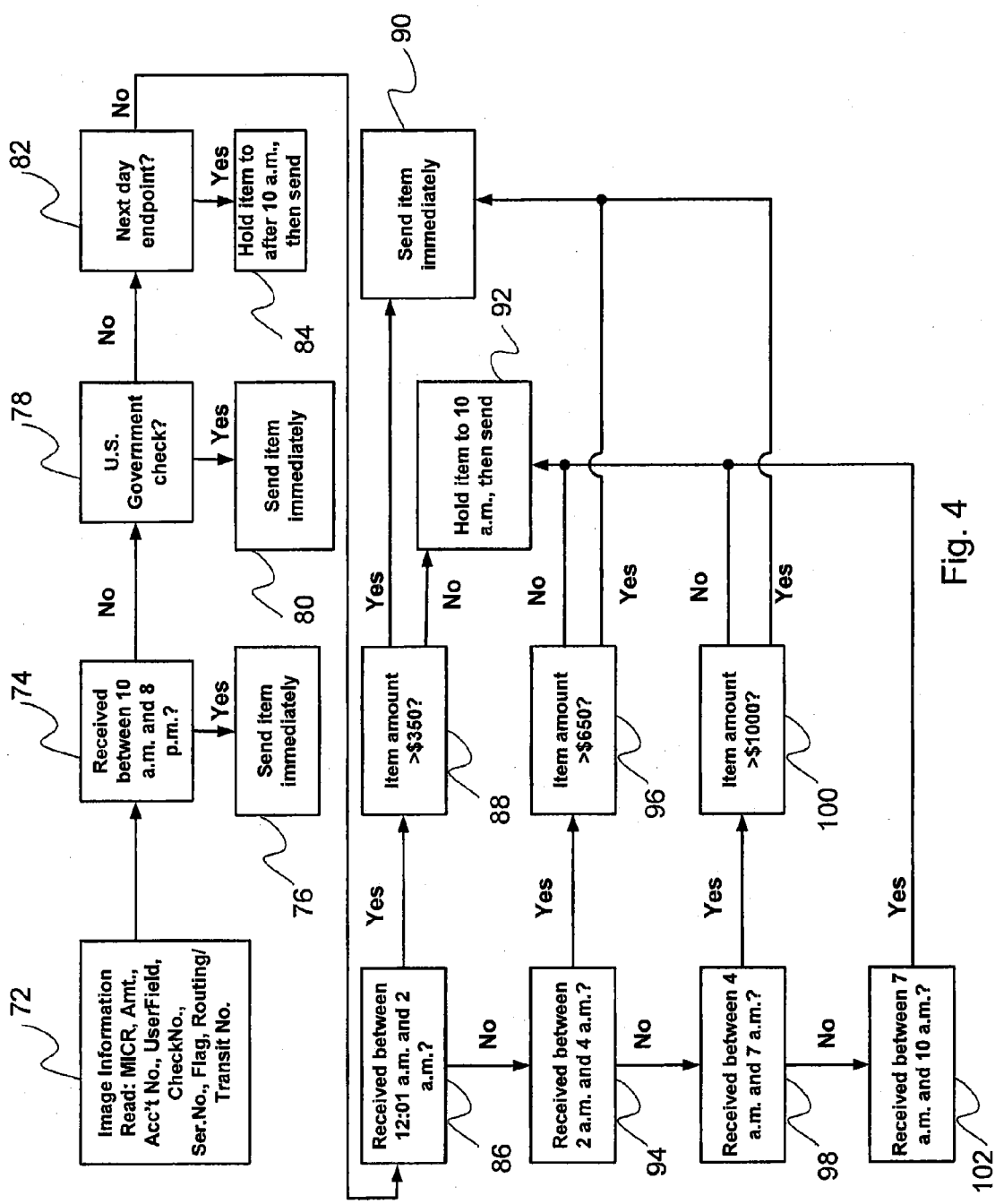
FIG. 4 is a flow chart showing the application of rules for sorting check and other financial instrument files.

The application of sorting rules by the sort function module 44 is shown in FIG. 4. As indicated in block 72, the electronic check presentment module 42 may receive check image files from a regional check processing center 20 (see FIG. 1) and read the pertinent information from the check image files, such as the MICR line, the amount, the account number, user field, check number, serial number, flag and routing/transit number. As indicated in block 74, the sort function module 44 then may determine that the files have been received after the 10:00 a.m. deadline but before the 3:00 p.m. deadline. As shown in FIG. 3, that is the time of day with the lowest per item fees charged by the Federal Reserve 46 for clearing check items. Accordingly, as indicated at block 76, the rule may provide that all check items received during this interval are forwarded or sent immediately and not stored for later routing to the Fed. Such a rule may require that such time intervals and fees be stored in the check processing control system 40 as a look-up table to be accessed by the sort function 44, or stored as a sort pattern.

Referring again to FIG. 4, as shown in block 78, the rule may determine from scanned information whether the subject check is a check drawn on the United States government (which may include eligible Treasury items and Postal Money Orders). If so, that check image file may be sent by the check processing control system 40 to the image export server 36 for immediate clearing with the Federal Reserve 46. This is because the Federal Reserve does not charge a per item fee for checks drawn on the United States government if they are deposited in a separate cash letter. Accordingly, there may be no benefit to storing such checks for clearing at a later time. Such checks may be sent for clearing, as indicated in block 80. It should be noted that since the steps performed in blocks 74 (immediate forwarding of all check items received after the 10:00 a.m. deadline and before the 8:00 p.m. deadline) and 78 (immediate forwarding of all United States government check items) have the same result, they may be performed chronologically in either order.

As indicated in block 82, the rule applied by the sort function module (see FIG. 1) may include a comparison of the routing/transit number of the check item to the Availability Schedule of the Federal Reserve 46. Such endpoints may be listed in a look-up table as part of the check processing control system 40. If the endpoint (i.e. payee bank) is on the list of the Fed's "next day" endpoints, then, as indicated at block 84, the item may be held in storage 38 (FIG. 1) until the next, lowest per item clearing fee time interval. As indicated in the table of FIG. 3, that time interval may be after the 10:00 a.m. deadline and before the 3:00 p.m. deadline.

As shown in block 86 in FIG. 4, if the check item does not meet any of the criteria of blocks 74, 78 or 82 (i.e., the item is not a government check, not drawn on a bank on the Fed schedule of next day endpoints and has missed the 8:00 p.m. deadline), the rule applied by sort function 44 may determine whether the check item was received, and therefore can be forwarded, after the 12:01 a.m. deadline and before the 2:00 a.m. deadline. If it has, then as shown in block 88 the rule may determine whether the amount of the check item is greater than a threshold amount, such as $350.00. If it is, then as indicated at block 90 the check item may be forwarded during that time interval to the Federal Reserve 46 for clearing. If the check item is less than $350.00, as shown in block 92, the item may be held in storage 38 for forwarding during a time having with a lower per item fee, such as after the 10:00 a.m. deadline and before the 3:00 p.m. deadline.

As shown in block 94, if the check item is received after the 2:00 a.m. deadline but before the 4:00 a.m. deadline, and can be forwarded during that time period, the rule applied by the sort function 44 may determine whether the amount of check item is greater than a second threshold amount, such as $650.00, as shown in block 96. If it is, then as indicated in block 90 the item may be sent to the Federal Reserve 46 for clearing. If it is not, then the item may be held in storage 38 for sending at a later time during which the per item fee is lower, such as after the 10:00 a.m. deadline and before the 3:00 p.m. deadline, as indicated at block 92.

As shown in block 98, if the check item is received after the 4:00 a.m. deadline and before the 7:00 a.m. deadline, and can be forwarded during that time interval, the rule applied by the sort function 44 may determine whether the amount of the check item is greater than a third threshold amount, such as $1000.00, as shown in block 100. If so, then as indicated in block 90 the item may be sent for clearing to the Federal Reserve 46. If not, the item may be held in storage 38 for sending at a later time during which the per item fee is lower, such as after the 10:00 a.m. deadline and before the 3:00 p.m. deadline, as indicated at block 92.

The per item fee charged by the Federal Reserve 46 may be the highest for check items cleared after the 7:00 a.m. deadline and before the 10:00 a.m. deadline. If files containing check items are received by the system 10 between that 7:00 a.m. deadline but before the 10:00 a.m. deadline, then as shown in block 102 the rule or sort pattern applied by the sort function 44 may hold all check items in storage 38 until a later time at which the per item fee is less, such as after the 10:00 a.m. deadline and before the 3:00 p.m. deadline, as shown in block 92. Alternatively, the rule may hold check items for storage whose amounts are below a fourth threshold amount.

It should be noted that the forgoing deadlines and threshold amounts are provided by way of example, and that other deadlines and threshold amounts may be selected without departing from the scope of the invention. Further, the time intervals used in the disclosed method are reflective of the per item fee schedule charged by the Federal Reserve. Combinations of threshold amounts and holding or delaying the sending of check items for clearing by the Federal Reserve may be derived from the disclosed system and method to maximize savings in processing fees in comparison to a system where check items are forwarded for clearing immediately upon receipt regardless of amount or the time of day received.

The foregoing system and method describe a process for the electronic processing of check image files for eventual clearing by a clearinghouse or other check clearing provider, such as the Federal Reserve, which charges a per item clearing fee that varies with the time of day, in a manner that results in a cost savings to the bank or financial institution that performs the check processing function.

While the methods and systems described herein constitute preferred embodiments, it is to be understood that other systems and methods may be employed, or modifications may be made of the disclosed method and system, without departing from the scope of the invention.

What is claimed is:

1. A method for clearing financial instruments through an electronic clearing system in which a cost of clearing an instrument varies with a time of day, comprising:

receiving by a gateway over a network electronic files of items including data from scanned financial instruments including an amount of each of said instruments, said data including a MICR line, amount, account number, user field, check number, serial number, flag and routing/transit number from said scanned financial instrument;

applying a rule by a processing control system to sort said items by determining, for each of said associated financial instruments, whether said item associated with said instrument should be stored for clearing said associated financial instrument at a later time having a relatively lower-cost per item fee, or forwarded for clearing said associated financial instrument without storage, said rule including a first step of determining whether said associated financial instrument is issued by the United States government, and if so, forwarding said associated item by said gateway over said network for clearing without storage;

a second step of determining whether said instrument is drawn on a financial institution listed on a Federal Reserve schedule as a next day endpoint; and if so, storing said associated file in a storage device by said gateway for forwarding at a later time having a lower per item fee;

a third step of determining whether said associated financial instrument can be cleared before a first deadline having associated therewith a lowest-cost per item fee, and if so, forwarding said instrument by said gateway over said network for clearing without storage;

a fourth step of determining whether said electronic file is received before a second deadline, different from said first deadline, determining whether each of said items contained in said received electronic files exceeds a first threshold amount, and forwarding said items exceeding said first threshold amount by said gateway over said network for clearing without storage, and placing said items not exceeding said first threshold amount in a storage device for forwarding by said gateway over said network for clearing before a subsequent said first deadline;

a fifth step of determining whether said electronic file is received before a third deadline, different from said first and second deadlines, determining whether each of said items contained in said received electronic files exceeds a second threshold amount, and forwarding said items exceeding said second threshold amount by said gateway over said network for clearing without storage, and placing said items not exceeding said second threshold in said storage device for forwarding by said gateway over said network for clearing during a subsequent said first deadline; and a sixth step of determining whether said electronic file is received before a fourth deadline, different from said first, second and third deadlines, determining whether each of said items contained in said received electronic files exceeds a third threshold amount, and forwarding said items exceeding said third threshold amount over said network by said gateway for clearing without storage, and placing said items in said storage device for forwarding over a network for clearing during a subsequent said first deadline; and a seventh step of determining whether said electronic file is received before a fifth time of day deadline, different from said first, second, third and fourth deadline, having associated therewith a highest-cost per item fee, and if so, placing said item in said storage device for forwarding over said network by said gateway for clearing during a subsequent one of said first time of day intervals.

2. The method of claim 1 wherein receiving by said gateway said electronic files of items includes receiving files of information scanned from paper checks.

3. The method of claim 2 wherein receiving by said gateway includes receiving said electronic files of items from regional check processing centers.

4. The method of claim 2 wherein receiving by said gateway said electronic files of items includes receiving images of both sides of said paper checks.

5. The method of claim 2 wherein receiving by said gateway said electronic files of items includes receiving an electronic cash letter.

6. The method of claim 5 wherein said electronic cash letter includes at least one of an amount of each check, a sequence number of each check, bundle totals and a grand total of said electronic cash letter.

7. The method of claim 1 wherein said receiving by said gateway includes converting a format of said electronic files to an I-string.

8. The method of claim 7 further comprising checking for accuracy and completeness check image files included in said data from financial instruments.

9. The method of claim 8 further comprising flagging and correcting defective ones of said check image files.

10. The method of claim 9 further comprising merging images from said I-string with corrected reject data to create an M-string.

11. The method of claim 1 further comprising generating a report that reconciles and balances said items.

12. The method of claim 1 further comprising scanning said items to create said electronic files.

13. The method of claim 12 further comprising scanning at least one of a MICR line, an amount, an account number, a user field, a check number/serial, a flag and a routing and transit number.

14. The method of claim 1 wherein said second step includes an image export server of said gateway storing said associated file in said storage device.

15. The method of claim 1 wherein said second step includes a gateway server of said gateway storing said associated file in a storage system created by said gateway.

16. A system for electronically clearing checks through a clearing system in which a cost of clearing a check varies with a time of day, comprising:

a control system having a processor for receiving files of items including data scanned from checks including an amount of said checks, a MICRA line, account number, user field, check number, serial number, flag and routing/transit number;

storage for storing said items not sent for clearing;

said processor being programmed to apply a rule to sort said items by determining, for each associated check, whether said item associated with said check should be stored in said storage for sending at a later, relatively lower-cost time interval or forwarded for clearing the instrument without storage, said rule including a first step of determining whether said check is issued by the United States government, and if so, forwarding said check for clearing without storage;

a second step of determining whether said check is drawn on a financial institution listed on s Federal Reserve schedule as a next day endpoint, and if so, storing said associated item in said storage for forwarding at said later time of day;

a third step of determining whether said check is received and the items therein can be forwarded during a first time of day interval having a lowest per item fee for clearing, and if so forwarding said items for clearing without storage;

a fourth step of determining whether said check is received and the items therein can be forwarded during a second time of day interval, and determining whether the check associated with each of said items contained in said received electronic file exceeds a first threshold amount, and if so, forwarding said associated item for electronic clearing, and if not, storing said associated item in said storage;

if said electronic file is received during a third time of day interval different from said first and second time of day intervals, determining whether said check associated with each of said items contained in said received electronic files exceeds a second threshold amount greater than said first threshold amount, and if so, forwarding said associated item for electronic clearing, and if not, storing said associated item in said storage; and if said electronic file is received during a fourth time of day interval different from said first, second and third time intervals, determining whether said check associated with each of said items contained in said electronic files exceeds a third threshold amount greater than said first and second threshold amounts, and if so, forwarding said associated check for electronic clearing, and if not, storing said associated item in said storage;

a gateway server for receiving said electronic files of data scanned from checks and communicating said associated files to said control system; and an image export server for receiving said associated electronic files from said control system, storing those of said items sorted by said processor for storage, transmitting those of said items sorted by said processor to said gateway server for clearing without storage, and retrieving said stored items for transmission to said gateway server for clearing during said later, relatively lower-cost time interval.

17. The system of claim 16 wherein said control system receives said files in X9.37 format, said control system converts said associated electronic files to merged string data for sorting by said processor, and said image export server converts said associated electronic files back to X9.37 format for clearing.

* * * * *